US008356726B2

(12) United States Patent
Romandy et al.

(10) Patent No.: US 8,356,726 B2
(45) Date of Patent: Jan. 22, 2013

(54) LID HOLDER FOR COOKING VESSEL (75) Inventors: Mark K. Romandy, Midlothian, VA (US); David Schandel, Richmond, VA (US); James R. Gaynor, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 552 days.

(21) Appl. No.: 12/502,734

(22) Filed: Jul. 14, 2009

(65) Prior Publication Data
US 2009/0272749 A1 Nov. 5, 2009

Related U.S. Application Data (63) Continuation-in-part of application No. 12/048,811, filed on Mar. 14, 2008.

(51) Int. Cl.
*B65D 25/00* (2006.01)
(52) U.S. Cl. ...... 220/744; 220/379; 220/912; 220/573.1
(58) Field of Classification Search ............... 220/744, 220/573.1, 912, 379, 763, 756, 720, 735
See application file for complete search history.

(56) References Cited

U.S. PATENT DOCUMENTS

| 576,887 | A | | 2/1897 | Pratt | |
|---|---|---|---|---|---|
| 1,155,261 | A | * | 9/1915 | Mitchell | 217/81 |
| 1,263,892 | A | * | 4/1918 | Holdsworth | 220/744 |
| 1,298,212 | A | | 3/1919 | Holdsworth | |
| 1,334,908 | A | * | 3/1920 | Kinzel | 220/832 |
| 1,390,766 | A | * | 9/1921 | Cunningham | 220/744 |
| 1,476,966 | A | * | 12/1923 | Hachmann | 16/252 |
| 1,732,988 | A | | 10/1929 | Ruhmann | |
| 1,745,548 | A | * | 2/1930 | Lerner | 248/229.26 |
| 1,836,014 | A | * | 12/1931 | Chamberlain | 30/327 |
| 1,928,995 | A | | 10/1933 | De Biasi | |
| 2,098,858 | A | | 11/1937 | Busson et al. | |
| 2,315,089 | A | * | 3/1943 | Dohrmann | 220/201 |
| 2,373,722 | A | | 4/1945 | Von Opel | |
| 2,541,604 | A | | 2/1951 | Normandin | |
| 2,705,657 | A | * | 4/1955 | Di Giorgio | 294/27.1 |
| 3,081,395 | A | | 3/1963 | Wickenberg | |
| 3,163,385 | A | | 12/1964 | Lazan, Jr. | |
| 3,384,385 | A | | 5/1968 | Cohen et al. | |
| 3,635,371 | A | | 1/1972 | Oxel | |
| 3,850,331 | A | | 11/1974 | Oxel | |
| 4,206,853 | A | * | 6/1980 | Iten et al. | 220/759 |
| 4,375,711 | A | * | 3/1983 | Franzen et al. | 16/252 |

(Continued)

OTHER PUBLICATIONS

Office Action Issued Apr. 15, 2011 in U.S. Appl. No. 12/048,811.

(Continued)

*Primary Examiner* — Anthony Stashick
*Assistant Examiner* — Christopher McKinley
(74) *Attorney, Agent, or Firm* — Alexander D. Raring (57) ABSTRACT A cooking vessel for cooking foodstuff includes a base having an outer sidewall, a generally hollow interior and a generally open top. A lid is removably mounted to the base and complimentarily covers the open top of the base in a first position. A mounting support is attached to the outer sidewall of the base. A lid holder is removably mounted to the mounting support. The lid holder supports the lid in a second position. The open top of the base at least partially exposing the hollow interior when the lid is in the second position.

16 Claims, 8 Drawing Sheets

U.S. PATENT DOCUMENTS

| | | | |
|---|---|---|---|
| 4,635,613 A * | 1/1987 | Tucker et al. | 126/25 R |
| 4,957,039 A * | 9/1990 | Reyes | 99/340 |
| 5,073,993 A * | 12/1991 | Dewaal | 4/227.1 |
| 5,507,220 A * | 4/1996 | Jung | 99/403 |
| 5,683,010 A * | 11/1997 | Boyajian, Jr. | 220/744 |
| 5,823,385 A * | 10/1998 | Cautereels | 220/762 |
| 5,887,751 A * | 3/1999 | Kroscher | 220/759 |
| 5,941,411 A * | 8/1999 | Langenbach | 220/735 |
| 6,105,810 A * | 8/2000 | Daenen et al. | 220/366.1 |
| 6,220,477 B1 * | 4/2001 | Schneider | 220/763 |
| 6,234,067 B1 | 5/2001 | Schmidt | |
| RE37,518 E * | 1/2002 | Hardigg et al. | 16/438 |
| 6,763,965 B2 * | 7/2004 | Parenteau | 220/263 |
| 7,025,312 B1 * | 4/2006 | Dare | 248/176.1 |
| 7,090,094 B2 * | 8/2006 | Wade et al. | 220/764 |
| 7,694,844 B2 * | 4/2010 | Woo | 220/756 |
| 2006/0174776 A1 * | 8/2006 | Fissler | 99/403 |
| 2006/0237468 A1 | 10/2006 | Dukes | |
| 2007/0210061 A1 | 9/2007 | Tynes et al. | |
| 2009/0230134 A1 | 9/2009 | Romandy | |

OTHER PUBLICATIONS

Office Action issued May 9, 2012 in U.S. Appl. No. 12/048,811.

Office Action issued Oct. 28, 2011 in U.S. Appl. No. 12/048,811.

* cited by examiner

LID HOLDER FOR COOKING VESSEL

CROSS-REFERENCE TO RELATED APPLICATIONS

This application is a continuation-in-part (CIP) of pending U.S. patent application Ser. No. 12/048,811, filed Mar. 14, 2008 and entitled "Lid Holder for Cooking Vessel."

BACKGROUND OF THE INVENTION

This invention generally relates to lid holder for a cooking vessel and, more particularly, to a lid holder that is attached to an outer sidewall of a cooking vessel and engages with a lid handle to hold the lid in a generally vertical position.

Cooking vessels, such as pots, pans and slow cookers, often have a removable lid to prevent excessive evaporation and heat loss during cooking and between servings. There is often a need to intermittently remove, hold or store the hot lid while performing various activities required during cooking or serving. Because of the constrained confines and clutter of most kitchens and the short time period needed for accessing the contents of the cooking vessel, it is desirable to keep the lid close to the cooking vessel while accessing the contents of the cooking vessel. Additionally, the condensation and/or foodstuff left on the inner surface of the lid may drip from the lid and fall on nearby surfaces creating a mess and/or damaging certain surfaces such as wooden tables. Lid holders for holding the lid proximate the cooking vessel are known, such as disclosed in U.S. Pat. Nos. 1,745,548 and 5,683,010. However, known lid holders do not position the lid such that the moisture on the interior lid surface drips back into the cooking vessel. Additionally, known lid holders are either positioned on the rim or the handles of the cooking vessel thereby hindering normal use of the cooking vessel.

What is therefore needed, but not provided in the prior art, is a lid holder that is mounted on the outer sidewall of the cooking vessel and engages with the lid handle to direct the moisture draining from the lid back into the cooking vessel and leaves the rim and handles of the cooking vessel unobstructed. Additionally, it is desirable to provide a lid holder that is movable, rotatable and/or slidable from a lid support position to a storage position.

BRIEF SUMMARY OF THE INVENTION

Briefly stated, the present invention is directed to a cooking vessel for cooking foodstuff. The cooking vessel includes a base having an outer sidewall, a generally hollow interior and a generally open top. A lid is removably mounted to the base and complimentarily covers the open top of the base in a first position. A mounting support is attached to the outer sidewall of the base. A lid holder is removably mounted to the mounting support. The lid holder supports the lid in a second position. The open top of the base at least partially exposing the hollow interior when the lid is in the second position.

In another aspect, the present invention is directed to a cooking vessel for cooking foodstuff. The cooking vessel includes a base having an outer sidewall, a generally hollow interior and a generally open top. A lid is removably mounted to the base and complimentarily covers the open top of the base in a first position. A lid holder is mounted to the base and supports the lid in a second position. The open top of the base at least partially exposes the hollow interior when the lid is in the second position. The lid holder at least partially encloses a support which is movable between a support position in which the support extends partially above the open top of the base and a storage position in which the support is entirely below the open top of the base.

In yet another aspect, the present invention is directed to a lid holder for a cooking vessel. The lid holder includes a hub and a wire frame positioned within a portion of the hub. A push button is movably attached to the hub. A mounting support at least partially encloses the hub, the wire frame and the push button. The wire frame is movable with respect to the mounting support and the hub between a support position and a storage position.

BRIEF DESCRIPTION OF THE SEVERAL VIEWS OF THE DRAWINGS

The foregoing summary, as well as the following detailed description of three preferred embodiments of the invention, will be better understood when read in conjunction with the appended drawings. For the purpose of illustrating the invention, there is shown in the drawings three embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of a lid holder and/or cooking vessel in accordance with the present invention, and designated parts thereof. Unless specifically set forth herein, the terms "a," "an" and "the" are not limited to one element but instead should be read as meaning "at least one." The terminology includes the words noted above, derivatives thereof and words of similar import.

Figure 1:
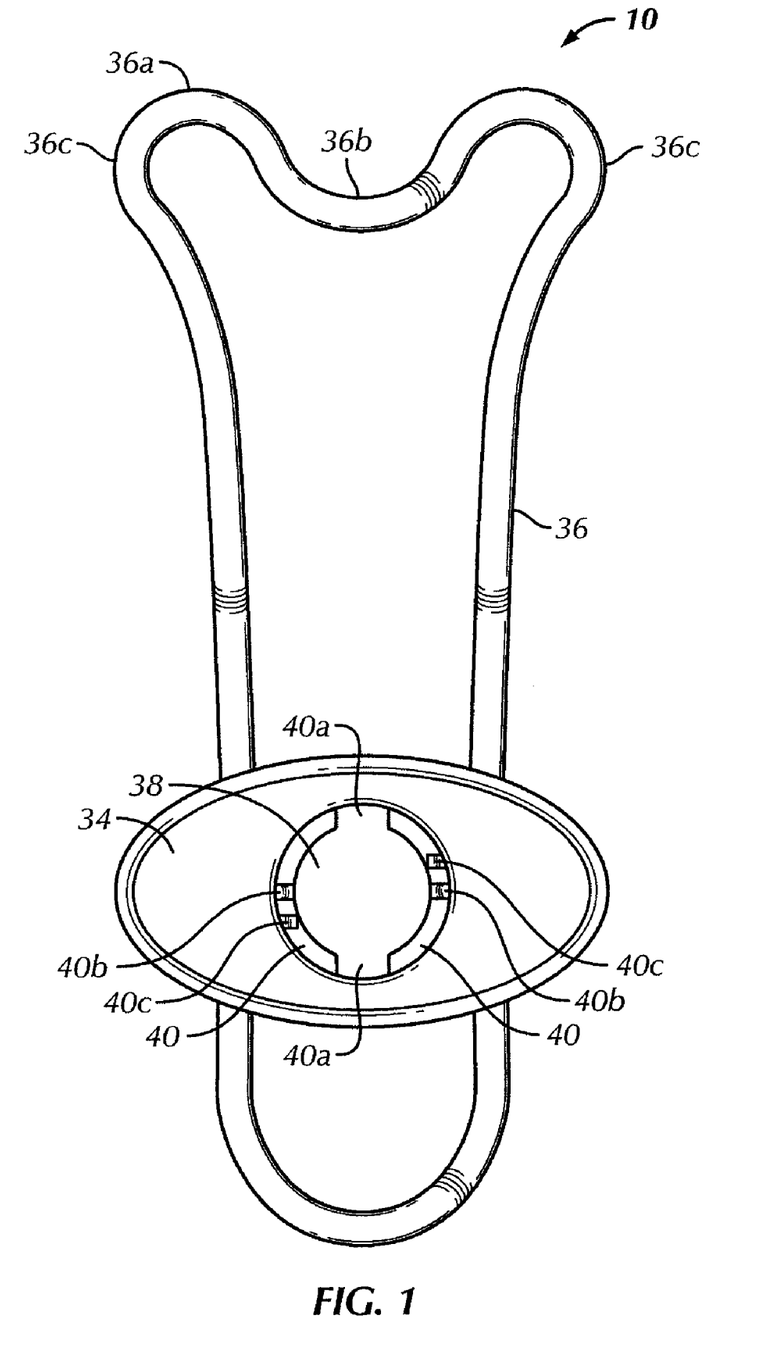
FIG. 1 is a front elevational view of a lid holder in accordance with a first preferred embodiment of the present invention.
Figure 2:
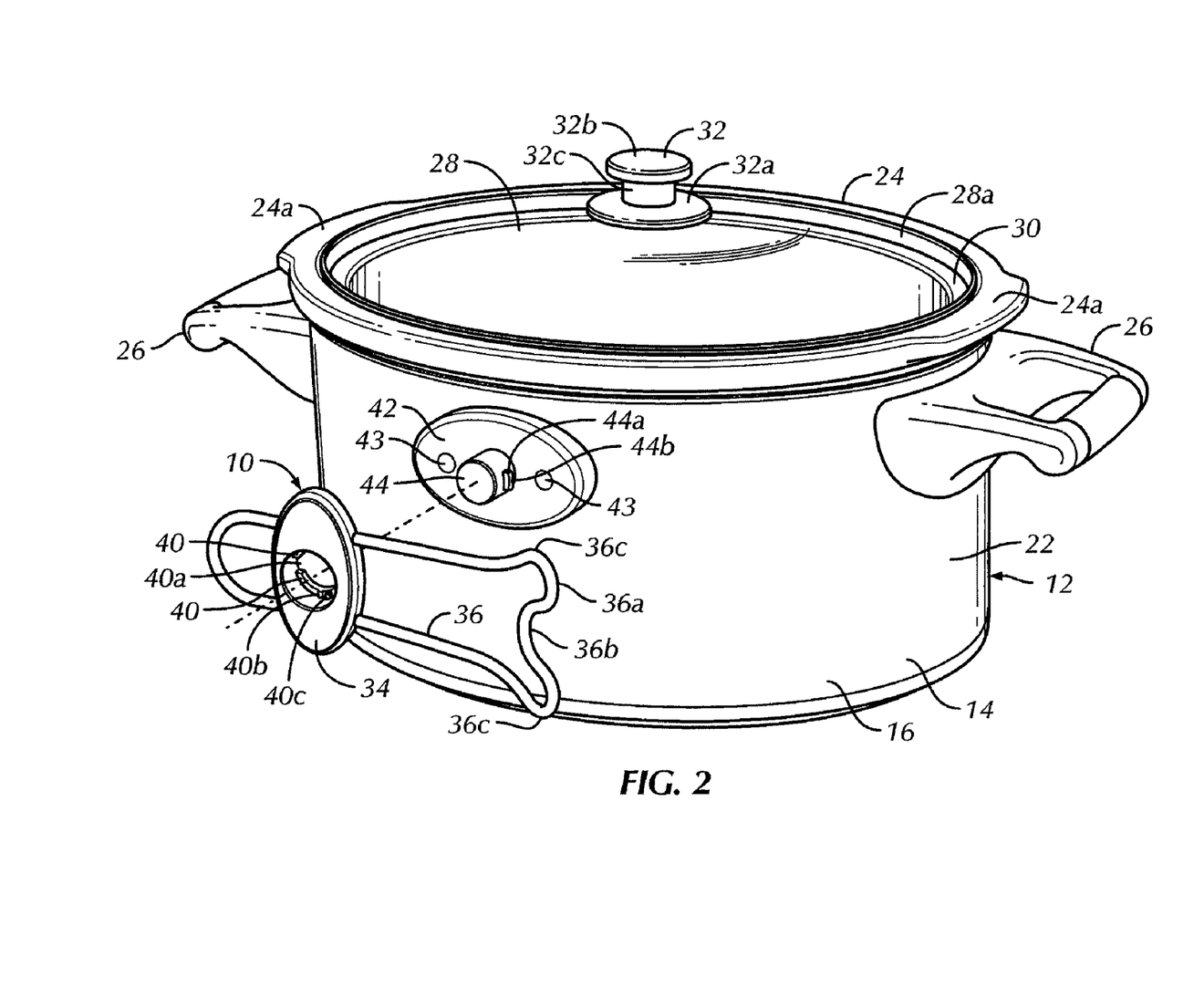
FIG. 2 is a perspective view of the lid holder of FIG. 1 shown separated from a cooking vessel.
Figure 3:
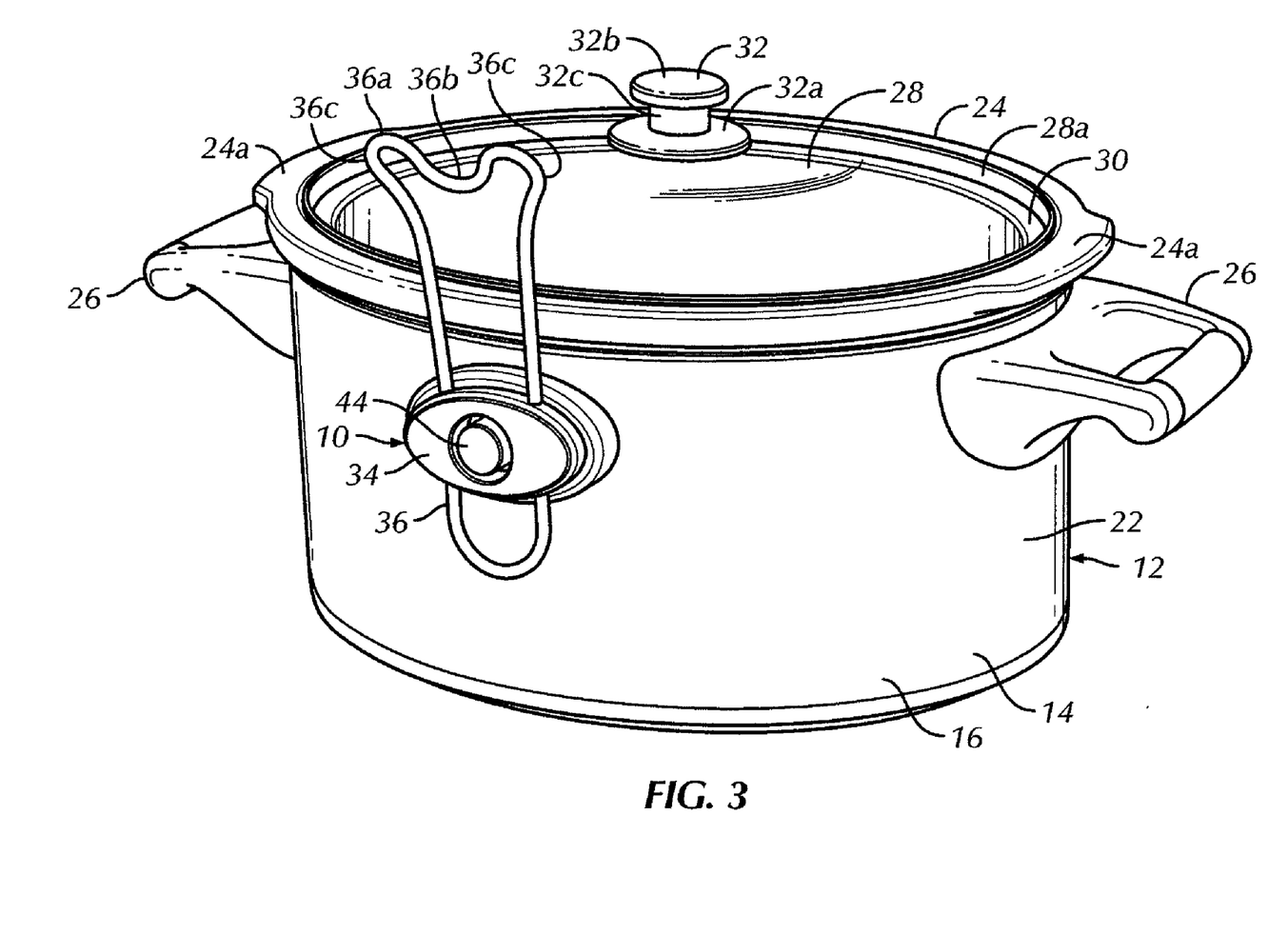
FIG. 3 is a perspective view of the lid holder of FIG. 1 shown mounted to a cooking vessel in a support position with a lid of the cooking vessel in a first position.
Figure 4:
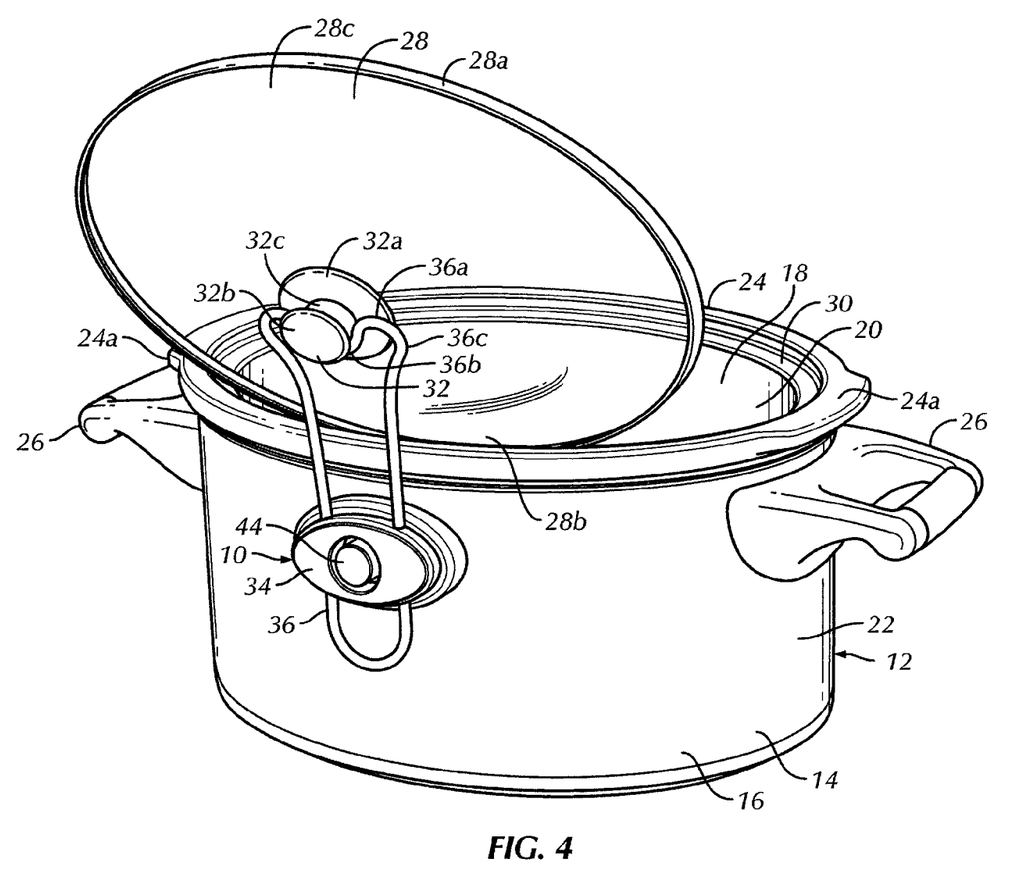
FIG. 4 is a perspective view of the lid holder and cooking vessel shown in FIG. 3 with the lid in a second position.
Figure 5:
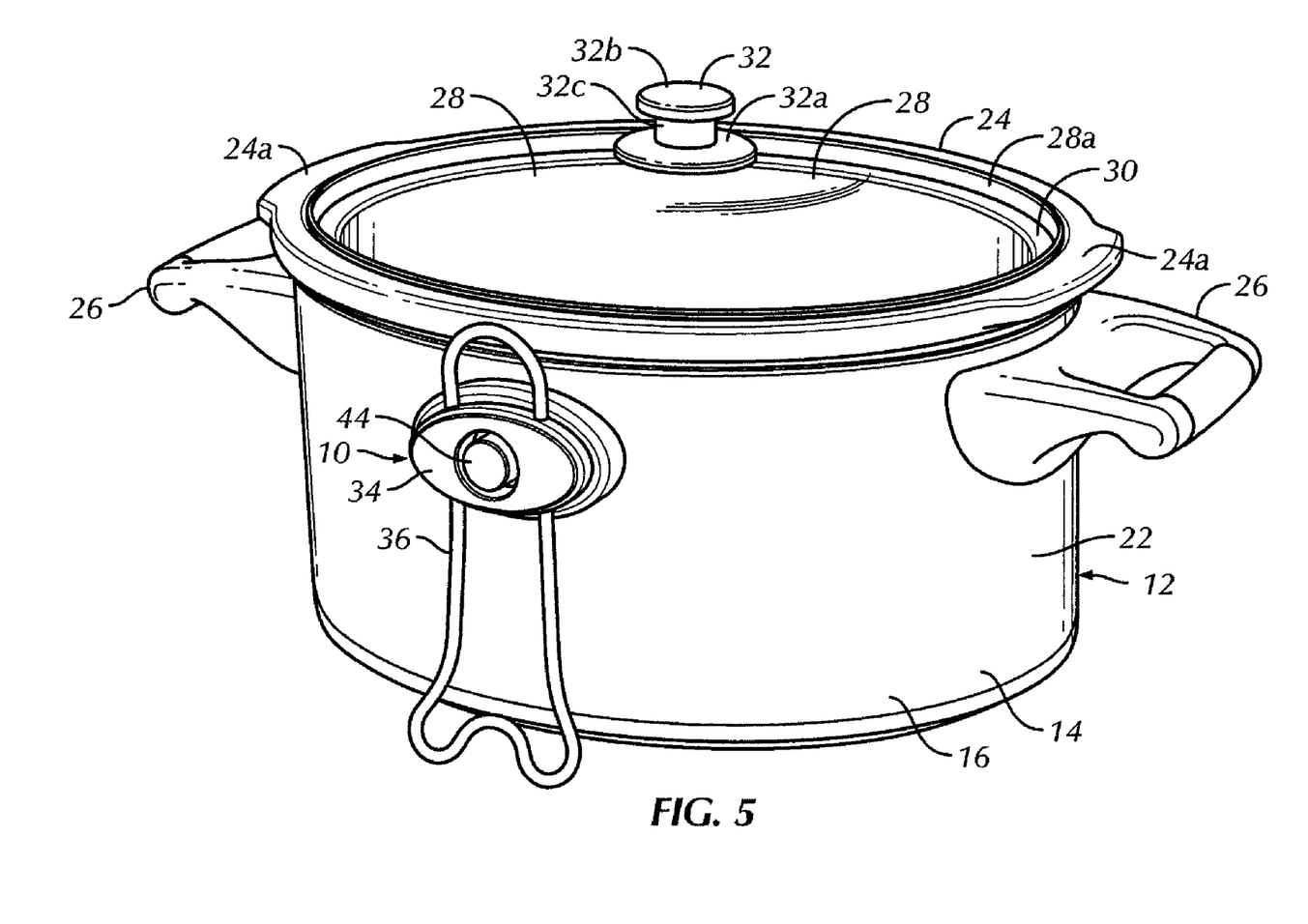
FIG. 5 is a perspective view of the lid holder and cooking vessel shown in FIG. 3 with the lid holder in a storage position.

Referring to the drawings in detail, wherein like reference numerals indicate like elements throughout, there is shown in FIGS. 1-5 a first preferred embodiment of a lid holder, generally designated 10, in accordance with the present invention. As seen in FIGS. 2-5, the lid holder 10 is for use with a cooking vessel, generally designated 12. The cooking vessel 12 includes a base 14 that has an outer sidewall 16, a generally hollow interior 18 and a generally open top 20 (see FIG. 4). The cooking vessel 12 includes a removably mountable lid 28. The lid 28 is removably mounted to the base 14 and complementarily covers the open top 20 of the base 14 in a closed or first position (FIGS. 2, 3 and 5). The base 20 preferably includes a rim 30 that is indented to receive an outer periphery 28a of the lid 28.

The lid 28 includes a handle 32 that is positioned in the approximate geometric center of the lid 28 and extends outwardly or upwardly from the base 14 when the lid 28 is in the first position. The lid 28 preferably includes a lid mount 32a attached to the lid 28, a lid knob 32b and a lid handle body 32c extending between the lid mount 32a and the lid knob 32b. The lid knob 32b is preferably larger in diameter than the lid handle body 32c to aid in gripping the lid knob 32b and for engaging with the lid holder 10, as is described in further detail below. The lid handle 32 may be removably or permanently mounted to the lid 28 or the lid handle 32 may be integrally formed with the lid 28. The lid 28 includes an interior surface (not shown) that opposes the handle 32 and faces the interior 18 of the base 14 when the lid 28 is in the first position.

The cooking vessel 12 is preferably in the form of a slow cooker of the type known in the art comprised of an outer heating unit 22 and a removable pot 24 that is disposed substantially within the heating unit 22 in an assembled position (shown in FIGS. 2-5). The heating unit 22 preferably includes a pair of heating unit handles 26 and houses a heating element (not shown). The heating element warms the removable pot 24 and cooks foodstuff (not shown) positioned within the hollow interior 18. The removable pot 24 preferably includes a pair of opposed pot handles 24a for removing the removable pot 24 from the heating unit 22. Slow cookers are well known in the art and further detail of the cooking vessel 12 is omitted for brevity only and is not limiting. Though it is preferred that the cooking vessel 12 be a slow cooker, the cooking vessel 12 may be any cooking vessel, pan or pot known in the art for cooking and warming foodstuff.

Referring to FIG. 1, the lid holder 10 is comprised of a hub 34 and a support 36. The support 36 is preferably fixedly attached to the hub 34 though the support 36 may be movably or releasable mounted to the hub 34. The hub 34 and support 36 may also be integrally formed. The hub 34 is preferably molded from a polymeric material though the hub 34 may be comprised of any suitable material. The support 36 is preferably comprised of a closed loop metallic wire frame formed from a rod having a circular cross section that forms an outlined or framed Y-shape. However, the support 36 may be comprised of any material such as a polymeric material, have any shape, such as oval or rectangular, and/or be comprised of a solid piece. The support 36 preferably includes a support end 36a that has an indent 36b that extends inwardly or downwardly toward the hub 34. The support end 36a may also extend outwardly on either lateral side of the indent 36b to form sides 36c that widen the support 36 and better support the lid 28. The support end 36a is preferably angled away from the cooking vessel 12 (see FIG. 3). The hub 34 preferably includes a central opening 38 that extends entirely through the hub 34, though the opening 38 may extend only partially into the hub 34. The hub 34 also preferably includes a retaining flange 40 that extends partially across the opening 38 and is recessed or discontinuous at one or more recesses 40a. Preferably, the retaining flange 40 includes a pair of recesses 40a that are generally opposed from each other. The retaining flange 40 also preferably includes at least one projection 40b and at least one stop 40c that each extend from the retaining flange 40, away from the base 12, and are positioned 90 degrees from the recesses 40a. The stops 40c are preferably positioned on alternate sides of the projections 40b.

Referring to FIG. 2, the lid holder 10 is mounted to the outer sidewall 16 of the base 14 on a side of the base 14 generally opposed from a control knob (not shown) for controlling the operating temperature of the cooking vessel 12. The lid holder 10 is preferably removably mounted to the outer sidewall 16 in a mounting position as shown. A mounting support 42 is preferably provided between the lid holder 10 and the base 14 though the hub 34 may be directly in contact with the outer sidewall 16. The mounting support 42 may be considered to be integral with the outer sidewall 16 for purposes of discussing the relationship between the lid holder 10 and the outer sidewall 16. The hub 34 is preferably spaced from the mounting support 42 by a washer or ring (not shown) extending from the hub 34 or the mounting support 42 such that the hub 34 does not fully contact the mounting support 42. A spaced relationship between the hub 34 and the mounting support 42 prevents mounting instructions or a graphic (not shown) printed or otherwise provided on the mounting support 42 from being rubbed or otherwise damaged by the rotating hub 34. The mounting support 42 is preferably fixedly attached to the base 14 with a pair of fasteners 43 though the mounting support 42 may be releasably mounted or integrally formed with the base 14. The fasteners 43 may also extend from the base 14 and into the mounting support 42 such that the fasteners 43 are not visible.

The mounting support 42 includes an axle 44 extending outwardly from the base 14 and extends at least partially through the hub 34 when the lid holder 10 is mounted on the mounting support 42. The axle 44 is preferably cylindrical in cross-section such that the hub 34 is rotatable about the axle 44 when the lid holder 10 is mounted on the mounting support 42. However, the axle 44 may have any suitable shape such as rectangular such that the lid holder 10 is removably mounted in a plurality of positions rather than being rotatable with respect to the axle 44. The axle 44 preferably includes at least one and preferably two opposed alignment tabs 44a (one alignment tab obstructed from view). When the lid holder 10 is mounted to the cooking vessel 12, the recesses 40a in the retaining flange 40 are aligned with the alignment tabs 44a and the alignment tabs 44a pass through the flange 40. The lid holder 10 may be mounted to or removed from the mounting support 44 in the position shown in FIG. 2, or a mirror image of the lid holder 10 with respect to the cooking vessel 12. The lid holder 10 is retained on the mounting support 42 and correspondingly the base 14 when the alignment tabs 44a extend through the flange 40 and the lid holder 10 is rotated in either direction. The alignment tabs 44a extend outwardly from the axle 44 and engage with the retaining flange 40 on the hub 34 when the lid holder 10 is mounted to the cooking vessel 12 such that the retaining flange 40 is sandwiched between the alignment tabs 44a and the mounting support 42.

Referring to FIGS. 2-5, the lid holder 10 is rotatable between a support position (FIGS. 3 and 4) and a storage position (FIG. 5). The lid holder 10 is preferably removable from the base 14 when the lid holder 10 is rotated about one half turn between the support and storage positions into the mounting position (FIG. 2) to remove the lid holder 10 for cleaning, aesthetic concerns or any other desired purpose.

The lid holder 10 may also be snap fit onto the base 14 or be removably or fixedly attached to the outer sidewall 16 of the base 14 in any suitable manner. When the lid holder 10 is in the support position, the support end 36a preferably extends above the open top 20 and the support end 36a extends entirely below the open top 20 in the storage position (FIG. 5).

With the lid holder 10 in the support position, the lid holder 10 engages the lid handle 32 to support the lid 28 in a second position (FIG. 4). The open top 20 of the base 14 at least partially exposes the hollow interior 18 of the base 14 when the lid 28 is in the second position. When the lid holder 10 is placed in the support position, the user removes the lid 28 from the cooking vessel 12 and pivots the lid 28 to a generally vertical position. The lid handle 32 is then placed within the indent 36b in the support end 36a of the lid holder 10 such that the lid handle body 32c rests within the indent 36b in the second position. The angle of the support end 36a of the lid holder 10 tilts the upper end 28c of the lid 28 away from the base 14 and a lower portion of the lid 28b opposed from the upper end 28c preferably rests on the rim 30, proximate the rim 30 or proximate or on an inner periphery of the base 14. Resting the lid 28 on both the rim 30 and the lid holder 10 helps to shift the weight of the lid 28 to the lid holder 10, prevents the lid 28 from moving and directs any condensation or foodstuff on the inner surface of the lid down into the interior 18 of the base 14 when the lid 28 is in the second position. When the user is done accessing the contents of the cooking vessel 12 or otherwise desires to replace the lid 28, the user grasps the lid 28 by the lid handle 32 and places the lid 28 back on the cooking vessel 12 in the first position (FIG. 3).

Referring to FIGS. 2 and 5, once the lid holder 10 is mounted to the base 14, the lid holder 14 may be rotated approximately 90 degrees between the mounting position and the storage position. The lid holder 10 may then be rotated 90 degrees in the opposite direction and then removed from the base 14. To install the lid holder 10 in the support position, the lid holder 10 is rotated 180 degrees from the position shown in FIG. 2, mounted to the base 14 and then rotated 90 degrees to the support position.

The alignment tabs 44a on the axle 44 preferably include a groove 44b that engages with one of the projections 40b on the hub 34 to snap-fit the lid holder 10 in either the storage or support position such that a predetermined amount of force is required to disengage the projections 40b from the alignment tabs 44a. The stops 40c on the hub 34 prevent the lid holder 10 from being rotated in one direction out of the storage or support positions. For example, when the lid holder 10 is mounted to the cooking vessel 12 in the mounting position (FIG. 2) the lid holder 10 is then rotated 90 degrees to the storage position (FIG. 5). The stops 40c prevent further rotation of the lid holder 10 in the same direction. Alternatively, the user may mount the lid holder 10 to the cooking vessel 12 in a mounting position that is rotated or flipped 180 degrees (not shown) from the mounting position shown in FIG. 2, mount the lid holder to the cooking vessel 12 and then rotate the lid holder 10 90 degrees to the support position (FIGS. 3 and 4). The stops 40c prevent the lid holder 10 from being rotated further in the same direction. The stops 40c allow for the lid holder 10 to be quickly rotated into position without a concern for over rotation. The stops 40c are configured such that the lid holder 10 is rotated 90 degrees clockwise with respect to the user's point of view into either the support or storage position, depending on the mounting position, and then must be rotated 90 degrees counterclockwise with respect to the user's point of view to remove the lid holder 10.

The mounting configurations are consistent with the general notion for opening and closing items that a clockwise twist, or right turn is associated with tightening and a counterclockwise twist, or left turn is associated with loosening. Here, the tightening motion corresponding to movement into the storage or support positions and loosening motion corresponding to movement into the mounting position for removing the lid holder 10 from the base 14. The support position and the storage position are preferably 180 degrees apart and require removing the lid holder 10 from the base and remounting in a different position between switching between the support position and the storage position. However, storage position is preferably any position that places the support end 36a below the open top 20 such that the lid holder 10 does not extend above the cooking vessel 12 and the lid holder 10 may be rotated between the support and storage positions without removing the lid holder 10 from the cooking vessel 12.

Figure 6:
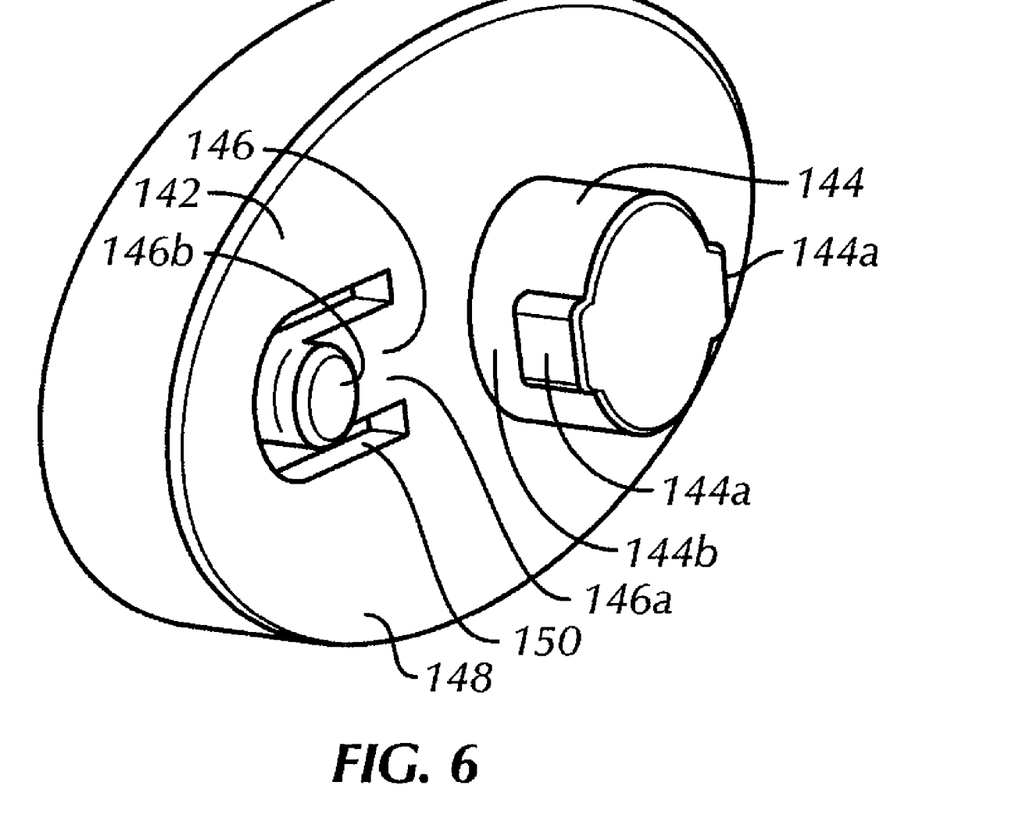
FIG. 6 is a front right perspective view of a mounting support of a lid holder in accordance with a second preferred embodiment of the present invention.

Referring now to FIG. 6, an alternative embodiment of the mounting support 142 generally used to attach the lid holder 10 to the cooking vessel 12 is shown, wherein like numerals are utilized to indicate like elements throughout and like elements of the present embodiment of the mounting support 142 are distinguished from like elements of the first preferred embodiment of the mounting support 42 by a factor of one hundred (100). The mounting support 142 of the second preferred embodiment is substantially similar in structure and operation to the mounting support 42 of the first preferred embodiment described in detail above.

Preferably, the mounting support 142 is attached directly to the outer sidewall 16 of the base 14 of the cooking vessel 12. Specifically, the mounting support 142 is preferably fixedly attached to the base 14 with a pair of fasteners (not shown). However, the mounting support 142 may be releasably mounted or integrally formed with the base 14. The fasteners preferably extend from the base 14 and into the mounting support 142 such that the fasteners are not visible to the user. The mounting support 142 includes a first or rear surface (hidden from view in FIG. 6) and an opposite and generally planar second or front surface 148 spaced-apart from the first surface. At least an outer circumference of the first surface is generally flush with an exterior surface of the outer sidewall 16 of the base 14. Although the first surface is preferably arcuate in shape to conform to the exterior surface of the outer sidewall 16 and the second surface 148 is preferably flat, both the first and second surfaces may be similarly shaped.

Similar to the first preferred embodiment, the mounting support 142 includes an axle 144 that extends outwardly from the base 14 and extends at least partially through the hub 34 when the lid holder 10 is mounted on the mounting support 142. The axle 144 includes at least one but preferably two spaced-apart alignment tabs 144a that engages with the at least one retaining flange 40 on the hub 34 to retain the lid holder 10 in the support and storage positions. In contrast to the first preferred embodiment, a first or front surface of each alignment tab 144a is preferably flush or co-planar to a front surface of the axle 144. Similar to the first preferred embodiment described above, the at least one alignment tab 144a is positioned along the axle 144 such that the lid holder 10 is removable from the mounting support 142 when the lid holder 10 is rotated between the support position and the storage position.

A primary difference between the two embodiments is that the mounting support 142 of the second preferred embodiment includes a movable projection, generally designated 146, located on or within the second surface 148. The movable projection 146 preferably provides increased friction between the mounting support 142 and the lid holder 10 when the lid holder 10 is in the support and storage positions. Specifically, the movable projection 146 is in the form of a cut-out or tab located between an outer edge of the second surface 148 and the axle 144. An arcuate or "C-shaped" slot 150 generally surrounds the movable projection 146 on three sides thereof. The movable projection 146 thus includes a planar shaft portion 146a that extends generally parallel with the second surface 148 and a raised or bulbous portion 146b at one end of the shaft portion 146a. The bulbous portion 146b preferably extends generally perpendicularly from the second surface 148. Due to the slot 150 and the size and shape of the movable projection 146, the movable projection 146 is relatively flexible or resilient as compared to the second surface 148 of the mounting portion 142, similar to a living hinge.

In operation, as the lid holder 10 is rotated on the mounting support 142 into either the support or storage positions, the movable projection 146 is initially pressed inward toward a geometric center of the cooking vessel 12 as an outer sidewall of the hub 34 is forced over the bulbous portion 146b. Once the outer sidewall of the hub 34 completely passes over the bulbous portion 146b, the movable projection 146 elastically restores itself to the initial position, generally co-planer with the second surface 148 of the mounting support 142, such that the bulbous portion 146b extends into a generally hollow interior portion of the hub 34. In this position, the bulbous portion 146b of the movable projection 146 helps to maintain the lid holder 10 in the desired position until the user manually grasps the lid holder 10 and rotates the lid holder 10 over the bulbous portion 146b such that the bulbous portion 146a and the movable projection 146 are slightly depressed towards the geometric center of the slow cooker 12.

Referring now to FIGS. 7-10, a third preferred embodiment of the lid holder for a cooking vessel is shown, wherein like numerals are utilized to indicate like elements throughout. The lid holder of the third preferred embodiment, generally designated 210, is similar in structure and operation to the first and second preferred embodiments described above. To distinguish similar structure of the third preferred embodiment from the previous two embodiments, similar features of the third preferred embodiment, as compared to the first and second preferred embodiments, are distinguished by a factor of two hundred (200).

Similar to the previous embodiments, the lid holder 210 is preferably mounted to the base 14 and supports the lid 28 in the second position (FIG. 4). Although it is preferred that the lid holder 210 be permanently fixed to the slow cooker 12, it is understood that the lid holder 210 may be removably and/or pivotably attached to the slow cooker 12. As was described in detail above, the open top 20 of the base 14 at least partially exposes the hollow interior 18 of the base 14 when the lid 28 is in the second position (FIG. 4). Similar to the previous embodiments, the lid holder 210 includes a support 236 preferably comprised of a closed loop metallic wire frame formed from a rod having a circular cross section. Although the support 236 is preferably generally in the form of an elongated oval with one eccentrically-shaped end, the support 236 may be formed in a variety of sizes and shapes. Furthermore, the support 236 may be comprised of any material, such as a polymeric material, and have any shape, such as oval or rectangular, and/or be comprised of a solid piece.

The support 236 preferably includes a support end 236a (i.e., the eccentrically-shaped end) that has an indent 236b that extends outwardly or downwardly toward a hub 234 of the lid holder 210. The support end 236a may also extend inwardly on either lateral side of the indent 236b. In contrast to the previous embodiments, the support end 236a is preferably angled toward the geometric center of the cooking vessel 12 when the lid holder 210 is mounted to the cooking vessel 12. The support end 236a is not limited to being angled toward the cooking vessel 12, as the support end 236a may be angled away from the cooking vessel 12 when the lid holder 210 is mounted to the cooking vessel 12. The handle 32 of the lid 28 preferably rests within the indent 236b when the lid 28 is in the second position (FIG. 4).

Preferably, the lid holder 210 at least partially encloses the support 236, which is movable between a support position (FIG. 8) wherein the support 236 extends partially above the open top 20 of the base 14 and a storage position (FIG. 9) wherein the support 236 is entirely below the open top 20 of the base 14. As shown in FIG. 8, the wire frame 236 of the present embodiment preferably includes a gap, opening or spacing 260 within at least a portion of the cross section of the wire frame 236. Preferably, the gap 260 extends completely through the cross section of the wire frame 236 such that the wire frame 236 is not a continuous closed loop. As will be described in detail below, the gap 260 allows the wire frame 236 to be selectively locked in place at at least two vertically spaced-apart locations. For example, the wire frame 236 may be locked in at least one of the support position (FIG. 8) and the storage position (FIG. 9).

Figures 7, 9, 10:
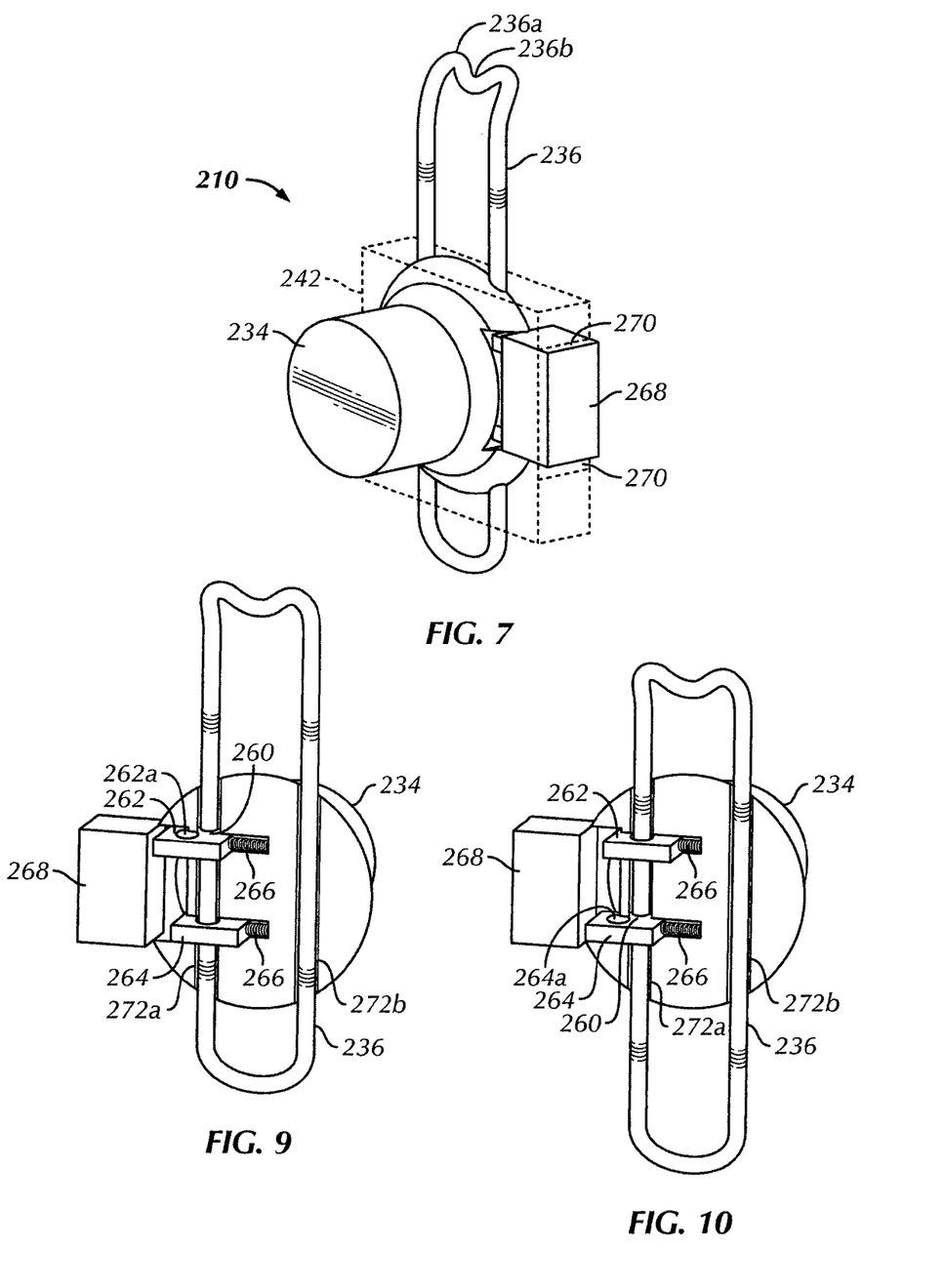
FIG. 7 is a front left perspective view of a lid holder in accordance with a third preferred embodiment of the present invention.
FIG. 9 is a rear elevational view of the lid holder of FIG. 7, with the support of the lid holder shown in a support position.
FIG. 10 is a rear elevational view of the lid holder of FIG. 7, with the support of the lid holder shown in a storage position.
Figure 8:
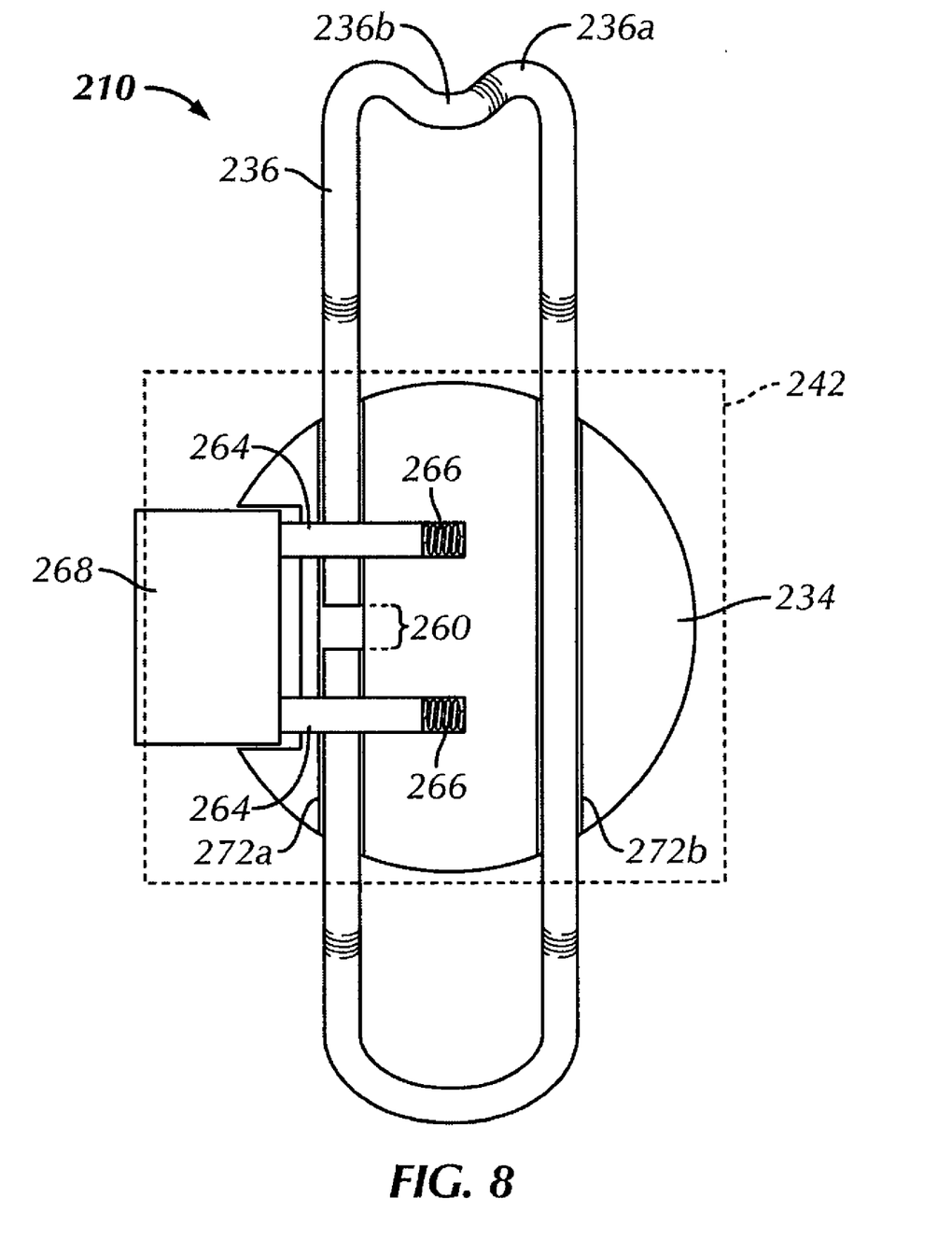
FIG. 8 is a rear elevational view of the lid holder of FIG. 7, with a support of the lid holder shown in an intermediate position.

The lid holder 210 preferably includes the hub 234 and a mounting support 242 (shown in phantom in FIGS. 7 and 8 for clarity). Similar to the previous two embodiments, the mounting support 242 of the present embodiment is preferably attached directly to the outer sidewall 16 of the base 14. The mounting support 242 preferably encloses at least a portion of the wire frame 236 and the hub 234. It is preferred that the mounting support 242 and the hub 234 are fixed with respect to the base 14 of the slow cooker 12. The wire frame 236 is preferably movably positioned within a portion of the hub 234, such that the wire frame 236 is movable and/or slidable with respect to the base 14, the mounting support 242 and the hub 234. Specifically, the hub 234 includes two spaced-apart and vertically-extending grooves 272a, 272b that provide a pathway for the wire frame 236 to move/slide. When viewing the hub 234 from above or below, the grooves 272a, 272b are semi-spherically-shaped to conform to the shape of at least a portion of the wire frame 236. A diameter of each groove 272a, 272b is preferably slightly larger than a diameter of the cross section of the wire frame 236, such that the grooves 272a, 272b help maintain the wire frame 236 in the proper vertical position without substantially inhibiting movement of the wire frame 236.

Referring to FIGS. 8-10, the lid holder 210 preferably includes at least one, but preferably two spaced-apart sliding locks 262, 264 for engaging and gripping the wire frame 236. Preferably, each sliding lock 262, 264 fits within a similarly sized and shaped slot of the hub 234. Furthermore, each sliding lock 262, 264 is generally rectangular in shape, but it is understood that the sliding locks 262, 264 are not limited to such shape. The sliding locks 262, 264 each include an opening or passageway 262a, 264a that extends therethrough generally perpendicular to a longitudinal axis of each sliding lock 262, 264. The openings 262a, 264a are sized and shaped to allow at least a portion of the wire frame 236 to pass therethrough. Preferably, at least one spring 266 biases each one of the sliding locks 262, 264 into engagement with the wire frame 236. Each spring 266 is thus movably positioned within a portion of the hub 234. The springs 266 are preferably conventional coil springs, but virtually any type, number or size spring may be used.

Referring again to FIGS. 7-10, the lid holder 210 preferably includes a push button 268 that is movably attached to the hub 234 and directly engages at least one but preferably both of the sliding locks 262, 264. Although the push button 268 is shown as a rectangular or square structure, this depiction is primarily intended to be schematic only, as the size and shape of the push button 268 may be modified to more effectively and easily allow for movement of the wire frame 236. As seen in FIG. 7, the push button 268 is at least partially enclosed by the mounting support 242 and partially extends beyond an opening 270 in the mounting support 242. In operation, depression of the push button 268 disengages at least one of the sliding locks 262, 264 from the wire frame 236 to allow the wire frame 236 to move from the support position (FIG. 9) to the storage position (FIG. 10). Thus, the push button 268 is movable between a first or completely depressed position (FIG. 8), wherein the wire frame 236 is capable of being freely moved with respect to the hub 234 and/or mounting support 242, and a second or released position (FIGS. 9 and 10), wherein the wire frame 236 is generally retained and/or locked in place in either the support position (FIG. 9) or the storage position (FIG. 10) due to the positioning of at least one of the sliding locks 262, 264.

Preferably, in the storage position (FIG. 10), a conventional electrical or power cord (not shown) of the cooking vessel 12 may be wrapped around at least a portion of the wire frame 236 that is below a hub 234 for convenience and an aesthetically-pleasing cord storage wrap. Specifically, when the cooking vessel 12 is in use, the electrical cord is plugged directly into a power source (not shown), such as a wall mounted electrical socket, to provide electrical energy to the heating element. However, when the cooking vessel 12 is not in use, the electrical cord may be consecutively wrapped around a lower portion of the wire frame 236 to protect the electrical cord, prevent it from becoming unnecessarily tangled and to prevent it from getting inadvertently caught on another object.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A cooking vessel for cooking foodstuff comprising:
   a base having an outer sidewall, a generally hollow interior and a generally open top;
   a lid removably mounted to the base and complementarily covering the open top of the base in a first position;
   a mounting support attached to the outer sidewall of the base and including an axle extending outwardly therefrom and a movable projection being spaced-apart from the axle; and
   a lid holder removably and rotatably mounted to the axle of the mounting support, the axle extends through a hub of the lid holder, the lid holder being rotatable between a support position and a storage position and supporting the lid in a second position, the open top of the base at least partially exposing the hollow interior when the lid is in the second position, at least a portion of the lid holder engaging a portion of the movable projection when rotated between the support and storage positions.

2. The cooking vessel of claim 1, wherein the lid holder extends partially above the open top of the base in the support position and is entirely below the open top of the base in the storage position.

3. The cooking vessel of claim 1, wherein the lid holder must be removed from the base and remounted onto the base before rotating the lid holder between the support position and the storage position.

4. The cooking vessel of claim 1, wherein the axle includes at least one alignment tab that engages with at least one retaining flange on the hub to retain the lid holder in the support and storage positions.

5. The cooking vessel of claim 4, wherein the at least one retaining flange is discontinuous around the inner periphery of the hub and the at least one alignment tab is positioned along the axle such that lid holder is removable from the mounting support when the lid holder is rotated between the support position and the storage position.

6. The cooking vessel of claim 1, wherein the mounting support includes a first surface and a generally planar second surface spaced-apart from the first surface, at least an outer circumference of the first surface being generally flush with an exterior surface of the outer sidewall of the base, the movable projection being located on the second surface.

7. The cooking vessel of claim 6, wherein the movable projection provides increased friction between the mounting support and the lid holder when the lid holder is in the support and storage positions.

8. A cooking vessel for cooking foodstuff comprising:
   a base having an outer sidewall, a generally hollow interior and a generally open top;
   a lid removably mounted to the base and complementarily covering the open top of the base in a first position; and
   a lid holder mounted to the base and supporting the lid in a second position, the open top of the base at least partially exposing the hollow interior when the lid is in the second position, the lid holder including a mounting support fixedly attached to the outer sidewall of the base and at least partially enclosing a wire frame support which is movable between a support position in which the support extends partially above the open top of the base and a storage position in which the support is entirely below the open top of the base.

9. The cooking vessel of claim 8, further comprising a gap located in a portion of the wire frame.

10. The cooking vessel of claim 8, wherein the lid holder further includes a hub, the mounting support enclosing at least a portion of the wire frame and the hub.

11. The cooking vessel of claim 10, wherein the lid holder further includes:
   a sliding lock for engaging and gripping the wire frame;
   a spring biasing the sliding lock into engagement with the wire frame; and
   a push button for engaging the sliding lock,
   wherein depression of the push button disengages the sliding lock from the wire frame to allow the wire frame to move from the support position to the storage position.

12. The cooking vessel of claim 11, wherein the push button is partially enclosed by the mounting support and partially extends beyond an opening in said mounting support.

13. The cooking vessel of claim 8, wherein the lid includes a handle and the lid holder includes an indent in a support end, the handle of the lid resting within the indent in the second position.

14. A lid holder for a cooking vessel comprising:
   a hub;
   a wire frame positioned within a portion of the hub, the wire frame being movable with respect to the hub in a first direction;
   a push button movably attached to the hub;

a mounting support at least partially enclosing the hub, the wire frame and the push button; and a sliding lock including an opening extending therethrough, the opening being sized and shaped to receive at least a portion of the wire frame therethrough, the sliding lock being movable with respect to the wire frame in a second direction generally perpendicular to the first direction, wherein the wire frame is movable with respect to the mounting support and the hub between a support position and a storage position.

15. The lid holder of claim 14, further comprising:
at least two spaced-apart sliding locks for engaging and gripping the wire frame; and
at least two spaced-apart coil springs movably positioned within a portion of the hub, each coil spring biasing one of the sliding locks into engagement with the wire frame.

16. The lid holder of claim 15, wherein the push button engages the sliding locks and is movably between a first position in which the wire frame is capable of being freely moved and a second position in which the wire frame is generally locked in place.

* * * * *